United States Patent [19]

Wood

[11] Patent Number: 5,404,279

[45] Date of Patent: Apr. 4, 1995

[54] FLIP-OPEN DECORATIVE HIDDEN LIGHT TRIM ASSEMBLY

[76] Inventor: Johnny L. Wood, 1006 Olde Towne, Irving, Tex. 75061

[21] Appl. No.: 198,314

[22] Filed: Feb. 18, 1994

[51] Int. Cl.⁶ .................................................. F21S 1/02
[52] U.S. Cl. ................................... 362/145; 362/249; 362/368; 362/806; 439/210
[58] Field of Search ............... 362/145, 152, 249, 368, 362/378, 391, 806; 439/207, 210, 211, 214, 215

[56] References Cited

U.S. PATENT DOCUMENTS

| | | | |
|---|---|---|---|
| 2,453,314 | 11/1948 | Hammerly | 439/211 |
| 3,569,691 | 7/1968 | Tracy | 362/806 |
| 3,692,993 | 9/1972 | Robinson | 362/249 |
| 5,041,002 | 8/1991 | Byrne | 439/211 |
| 5,311,414 | 5/1994 | Branham, Sr. | 362/249 |

Primary Examiner—Ira S. Lazarus
Assistant Examiner—Sara Sachie Raab
Attorney, Agent, or Firm—Harris, Tucker & Hardin

[57] ABSTRACT

A permanent lighting trim assembly features linearly interconnected trim members having a hollow body containing lights and an openable reflective cover member which permits the lights to be displayed at the appropriate season. The lights are protected during the remainder of the year when the cover panel is closed and the lights are hidden. The assembly includes standard length elongated trim members, corner members for extending a trim line around a corner, an adjustable trim member and a multiply adjustable trim member which may also contain lights which are hidden beneath an openable cover member. Each of the components has interconnected plug members at the ends which are notched to form a half-lap for a lap joint which facilitates electrical interconnection of the components along the trim line of the house. An unobtrusive lap joint is formed between components which have body configurations which match each other so that the assembled trim members look like a unified structure along the trim line.

21 Claims, 5 Drawing Sheets

FLIP-OPEN DECORATIVE HIDDEN LIGHT TRIM ASSEMBLY

BACKGROUND OF THE INVENTION

1. Field of the Invention

The invention lies in the field of permanent seasonal lighting, more particularly Christmas lighting for residential property.

2. Background of the Prior Art

Seasonal lighting displays are commonly installed around the eaves of a home, most commonly for Christmas decorations. Strings of lights having weatherproof bulbs are mounted on fasteners to extend around the eaves of the house just under the roof line. In other cases, they may be strung along the fascia to outline the house. With passing of the season, it becomes necessary to remove the light strings; otherwise, the appearance of the house is adversely affected and the lights are exposed to weather for a period of almost a year until the next season arrives. Unsightly nails or other fasteners frequently remain after the light strings have been removed because it is too much work to remove the fasteners which would have to be reinstalled next year.

It would be desirable to provide an assembly which decoratively follows the trim line of a house in a permanent installation, which would protect the lights during the long period in which they are not used, and expose the lights with a minimum of effort once the season arrives again. It is an objective of the invention to provide an inexpensive permanent seasonal lighting assembly made of mostly standardized interengageable parts which decoratively follow a trim line and includes variable length components and corner members which accommodate trim lines or portions of trim lines of different length while maintaining an illusion of continuity of lighting.

SUMMARY OF THE INVENTION

The invention is an assembly of interchangeable standardized component parts which can follow a selected trim line of a home. A selected trim line may be along the upper portion of the walls under the eaves or it may be on the fascia facing outward below the roof line. The combined assembly can circle the house along the selected trim line as desired.

The invention contemplates a relatively permanent installation containing a plurality of hidden lights which has a decorative appearance which may match or be painted to match the rest of the trim on the house.

The basic unit is an elongated trim member made, for example, in six-foot lengths. It has a thin-walled hollow body member containing an internal mounting panel which supports electrically interconnected lights which are longitudinally spaced on the mounting panel. The mounting panel is recessed in the body behind a hinged cover panel which is openable to display the lights. The inner surface of the cover panel is a shiny reflective surface which adds to the attractiveness of the display by providing a reflective surface which casts the light outwardly. The outer surface of the mounting panel on which the lights are mounted may also have a similar reflective surface which adds to the effectiveness of the display. Once the Christmas season is over, the cover panel may be closed to form a flat-front surface which hides the lights. A catch formed in the edge of the cover panel and the edge of the lower panel of the body serves to hold the cover in the closed position hiding the lights.

The opposite ends of the elongated trim member each contain a plug member, preferably of the opposite kind, which are electrically interconnected with the lights via wires. The ends protrude from the ends of the main body which contains the lights and mounting panel and on which the cover panel is mounted. The protruding ends form a half-lap which are about half the thickness of the main body in the depth direction. The ends are offset from each other in a depth direction and have what amounts to an L-shaped notch in the front of one end and behind the other end. The left end of one elongated trim member is thus able to form a lap joint with the right end of another elongated trim member to form an unobtrusive lap joint which are held together by the frictional engagement of the plug members that are present in each end. Multiple ones of these elongated trim members are thus electrically connected along a straight run of the selected trim line. When the cover panels of each are open, there is no discontinuity in the longitudinal spacing of the lights.

The assembly includes outside and inside corner members which are hollow bodies having right-angled arms which terminate in half-lap ends with plug members which are interconnected with wires running through the body of corner members. The half-lap ends are designed to exactly mate with the ends of the elongated trim member in electrical contact and held by the friction of the cooperating interengaged plug members. By means of the corner members, the trim line is carried around a corner. The half-lap ends also alternate so that one can engage the left side of an elongated trim member and the other end can engage the right side of an elongated trim member.

The assembly also includes an adjustable trim member which has a central straight portion and two telescopingly sliding end sections, one mounted slidingly on each end. The sliding end sections include ends with electrically interconnected plug members extending from a hollow body member. The hollow body member may contain a mounting panel and one or more lights and a hingeable cover panel with all of the characteristics of the cover panel of the elongated trim member. The ends are half-laps with L-shaped notches like the ends of the elongated trim member to form overlap joints and electrically interconnect another trim member on each side. The adjustable trim member facilitates the use of standard length elongated trim members which when combined would rarely be expected to exactly conform to the width of the side of the house. The adjustable trim members can extend or contract the assembly along the trim line to fit the running length needed. The adjustable trim members are provided in several adjustable lengths to provide a range of adjustments so the basic elongated trim members don't have to be cut.

The assembly also includes a multiply adjustable trim member which has longitudinally spaced apart straight base members with a slidingly adjustable end section on each end and an intermediate section having an opening in each side which slidingly accepts one end of the straight base members. The end sections are just like the end section of the adjustable trim member and may include a cover panel with hidden lights. The ends are, of course, notched to form lap joints which face in opposite directions and contain plug members which are wired through the center of the hollow structure to maintain electrical continuity. To maintain continuity of the lights, the intermediate section is equipped with a plurality of longitudinally spaced hidden lights and a hinged openable cover panel which exposes the lights. The multiply adjustable panel is adjustable at either end or at the intermediate section or both. It is more suitable for a longer adjustable section in that the intermediate section which may vary in length and number of lights, helps to maintain the continuity of the lighting display, together with any lights that may be present in the end sections.

Finally, the assembly may include a short hollow rectangular section with half-lap connections on the end having plug members, which is simply mitered to provide nonstandard angles, such as at the peak of the gable. It simply forms an attractive continuation of the trim line and electrically interconnects adjacent trim members on each side. Normally the trim line ends at a particular location whereby one of the plugs is exposed and may be connected to the power through a temporary extension cord. The permanent installation could be wired through a switch for convenience in turning the lights on and off. The exposure of the lights to the elements is limited to the season in which the lights are displayed. Once the cover panels are closed, the lights are protected from the elements during the rest of the year. It is relatively easy to open the cover panels when the next season arrives and the lights are permanently stored in their place of use and do not take up storage space elsewhere.

DETAILED DESCRIPTION OF THE PREFERRED EMBODIMENT

Figure 1:
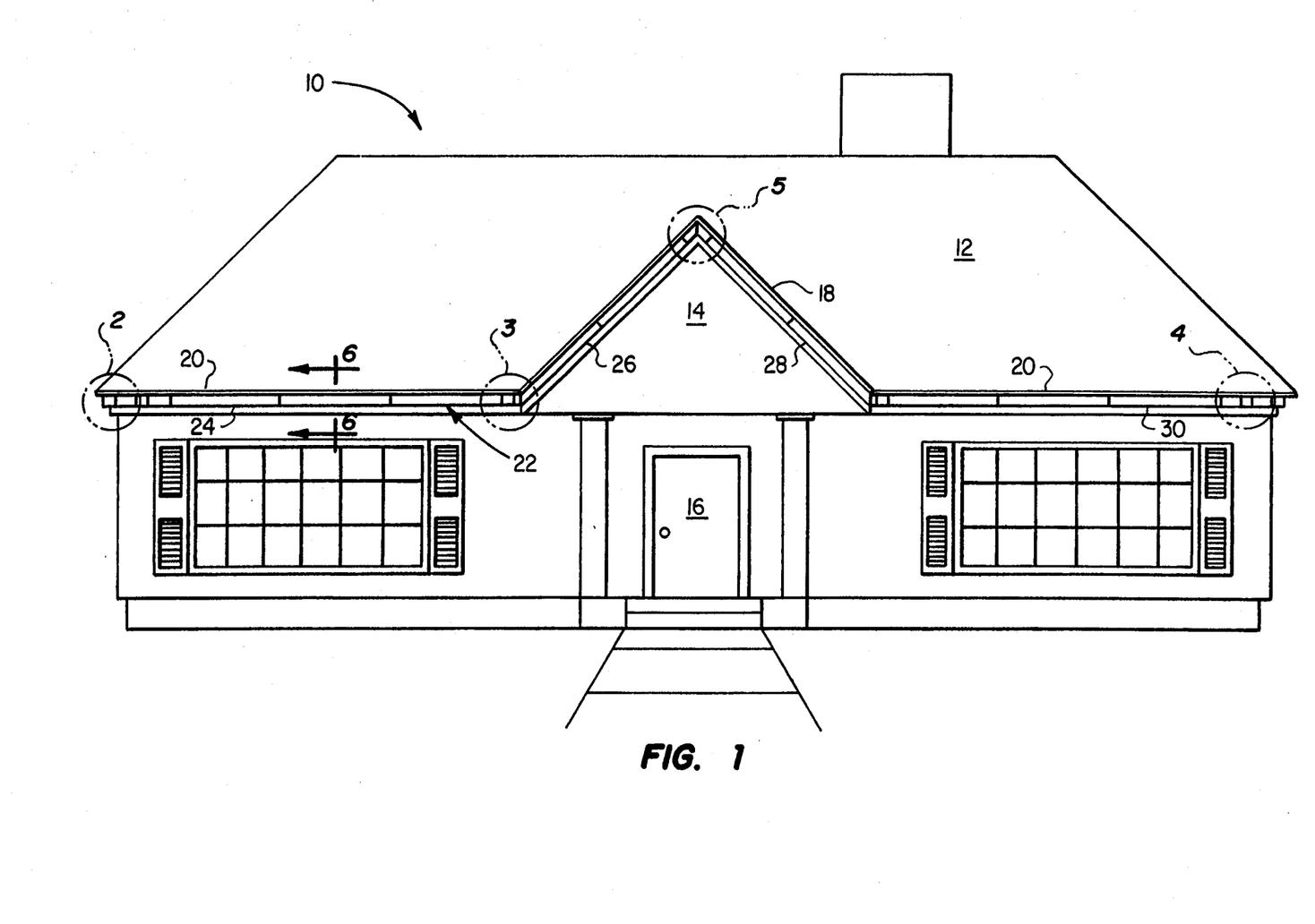
FIG. 1 is a front elevation view of a home having an angled roof with a forwardly extending gable over the entry in which the flip-open decorative hidden light trim assembly follows a selected trim line under the eaves of the roof.

In FIG. 1, a home 10 is illustrated having a roof 12, a gable 14 and an entry 16. It is understood that gable 14 extends frontwardly from the roof. The edge of gable 14 is identified with reference numeral 18 and the edge of the roof as 20. In the eaves, just under the edge of the roof, or on the fascia, is a trim line generally designated by the reference numeral 22. Trim line 22 includes a horizontal portion 24, and upwardly angled portion 26, a downwardly angled portion 28 and another horizontal portion 30 on the right. Additionally, there is a horizontal portion in the area marked 3 on the left side of the gable and a horizontal portion on the opposite right side of the gable which interconnect through a corner member at the back of the gable to the horizontal portions 24 and 30. There would also be horizontal portions seen in end view at the area 2 on the left side of the house and a corresponding horizontal section at the right side of the house wherein the horizontal portions on each side would be interconnected at a corner, and the trim line may be continued around the entirety of the perimeter of the house under the roof.

Figures 5, 6, 7:
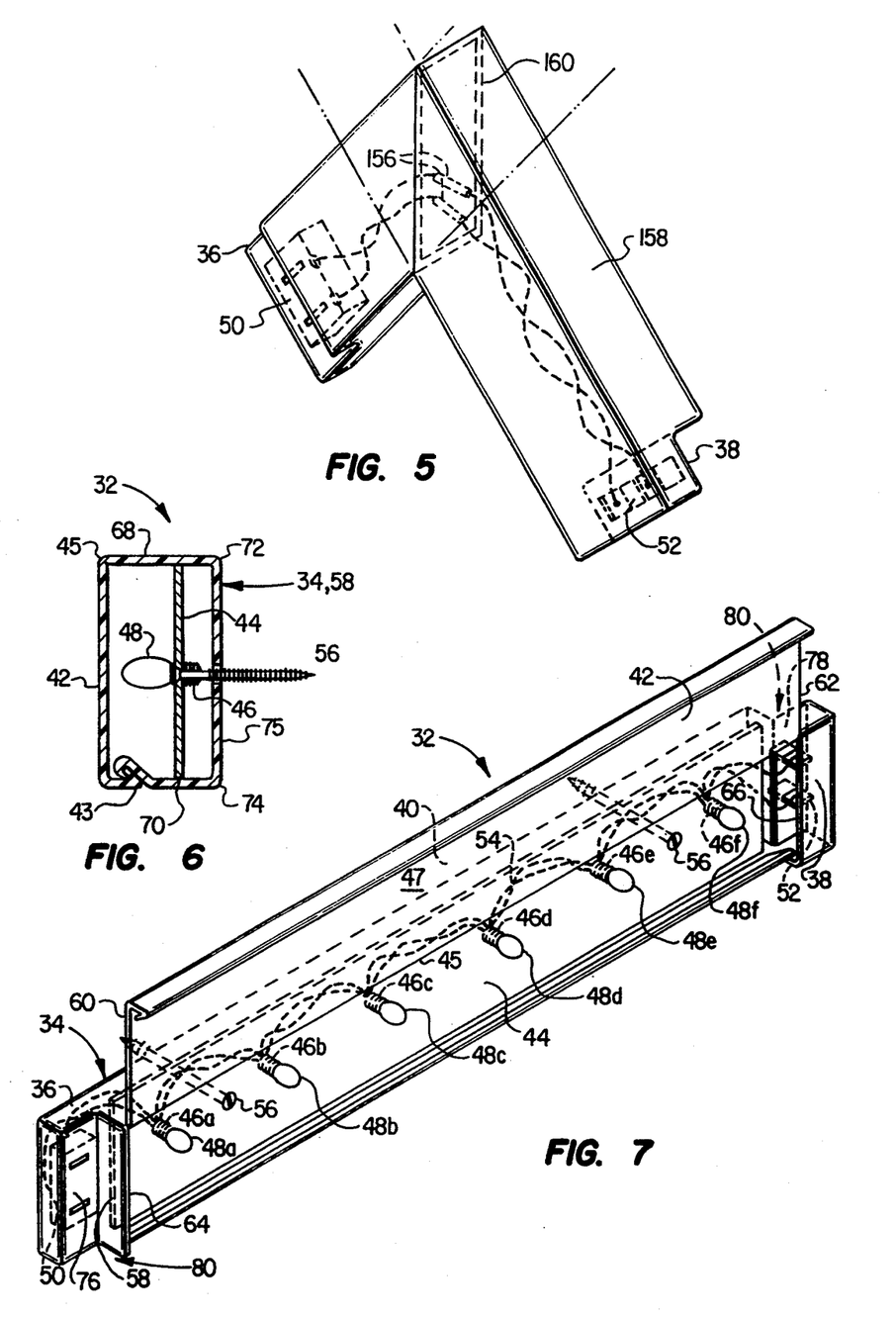
FIG. 5 illustrates in perspective how a short trim member with plug members at each end can be cut and mitered to accommodate a non-standard angle at an area such as area in FIG. 1.
FIG. 6 is a cross-sectional view on lines 6—6 of FIG. 1 of the elongated trim member of FIG. 7, showing a mounting panel and a cover panel closed to enclose lights.
FIG. 7 is an elongated trim member of the assembly of FIG. 1 with the openable cover panel in an open position to expose hidden lights mounted in the interior of the trim member on a mounting panel and interconnected between plug members located at each end.

Referring now to FIG. 7 is an elongated trim member generally designated 32. It has a hollow body 34 best seen in cross-section in FIG. 6. Hollow body 34 has opposite protruding ends 36 and 38 adapted to fit the end of another elongated trim member 32 by mating to form a joint wherein the combined trim members can follow a selected trim line. Hollow body 34 has a front surface 40 extending between the opposite ends, comprising a cover panel 42 which is openable to an open position shown in FIG. 7 to expose the interior of the hollow body and is recloseable to the closed position of FIG. 6. The bottom edge of front panel 42 and the bottom panel 70 may be formed to constitute a releasable catch 43 seen best in FIG. 6, to hold the panel in the closed position. The front cover panel 42 may have a hinge 45 connected to upper panel 68 to permit opening the cover panel. This is shown as a so-called living hinge 45 but could be any conventional hinge. An additional latch may be provided, if desired, to hold the cover panel in the open position of FIG. 7. The exposed surface 47 of the open cover panel 42 may be provided with a shiny reflective coating to reflect light from lights 48a-f.

A mounting panel 44 extending the length of the hollow body is spaced behind the cover panel in the hollow body. Mounting panel 44 has a plurality of light sockets 46 (46a-f) for lights 48 (48a-f). Opposite ends 36 and 38 have plug members 50 and 52 interconnected through sockets 46 by means of wires 54. One or more fasteners 56 serve to secure elongated trim member 32 against a wall surface. The mounting panel may also have a shiny reflective surface to reflect the lights.

More particularly, hollow body 34 is a main body 58 with thin right-angled walls having a length coextensive with the edges 60,62 of the cover panel 42 which comprises the front wall of main body 58 spaced over mounting panel 44 when the cover is closed. Main body 58 has a length defined by the edges 64,66 and a height defined by spaced apart upper wail 68 and lower wall 70 best seen in FIG. 6. Upper and lower wails 68,70 extend along the length of the trim member perpendicular to the front wall 42 when it is closed. The depth of main body 58 is also determined by the width of spaced apart upper and lower walls 68,70, having respective rear edges 72 and 74 defining between them a rear surface parallel to front wall 42 which can lie against the vertical surface of the home. Although this rear wall is shown as being a closed wall 75 in FIG. 6, it could also be open such that wails 68, 42 and 70 form a channel-shaped cross-section containing mounting panel 44. Mounting panel 44 is spaced forwardly from the rear surface or rear wall to accommodate sockets and wires in a space behind it. The vertical end surfaces of trim member 32 are preferably closed.

The opposite ends 36,38 of the elongated trim member protrude on each side a short distance beyond the length 64,66 of main body 58 and each have a facing surface. End 36 has a facing surface 76 and end 38 has a facing surface 78. The facing surfaces are parallel to the front wall and the rear surface. Ends 36,38 have a depth about half the depth of main body 58 so that a lap joint can be formed when one end of one elongated trim member is mated to the other end of another elongated trim member along a selected trim line. Plug members 50,52 in ends 36,38 preferably have a male portion (52) or a female portion (50) extending in the front to back depth direction from the facing surface. The male prongs extend from facing surface 78, the female openings extend into facing surface 76. It is also possible to make the hollow body flush with edges 64,66 and extend plug members from the ends to interconnect in the longitudinal direction.

Another way to describe the ends 36,38 of the elongated trim member 32 is to describe them in terms of L-shaped notches. One end 36 of the elongated trim member 32 extends from the rear surface forwardly to its facing surface 76 with an L-shaped notch 80 in front of its facing surface. The other opposite end 38 of the elongated trim member 32 extends from the front wall rearwardly to its facing surface 78 with an L-shaped notch 80 behind its facing surface wherein the L-shaped notches are the same size and shape, which is half the thickness of the body member in the depth direction. An end of one can therefore be connected to the end of another via the plug members in the ends to create a lap joint horizontally along the trim line. More particularly, end 36 may be referred to as an underlap connection extending from one side and end 38 may be referred to as an overlap connection extending from the other side of the hollow main body 58. The underlap and overlap connections are half as deep as the main body and offset from each other in the depth direction. The underlap connection has a frontwardly facing surface 76, the overlap connection having a rearwardly facing surface 78 which is hidden when viewed from the front. The underlap connection of one elongated trim member and the overlap connection of another elongated trim member are mateable with each other via their plug members to make an electrically connected overlap joint between adjacent trim members along the trim line in a smooth transition. The frictional resistance of the mating plug members hold them together. It is also possible that alternate trim members may have both underlap connections or both overlap connections. This is less desirable because it requires an additional part.

Figures 2A, 2B, 3:
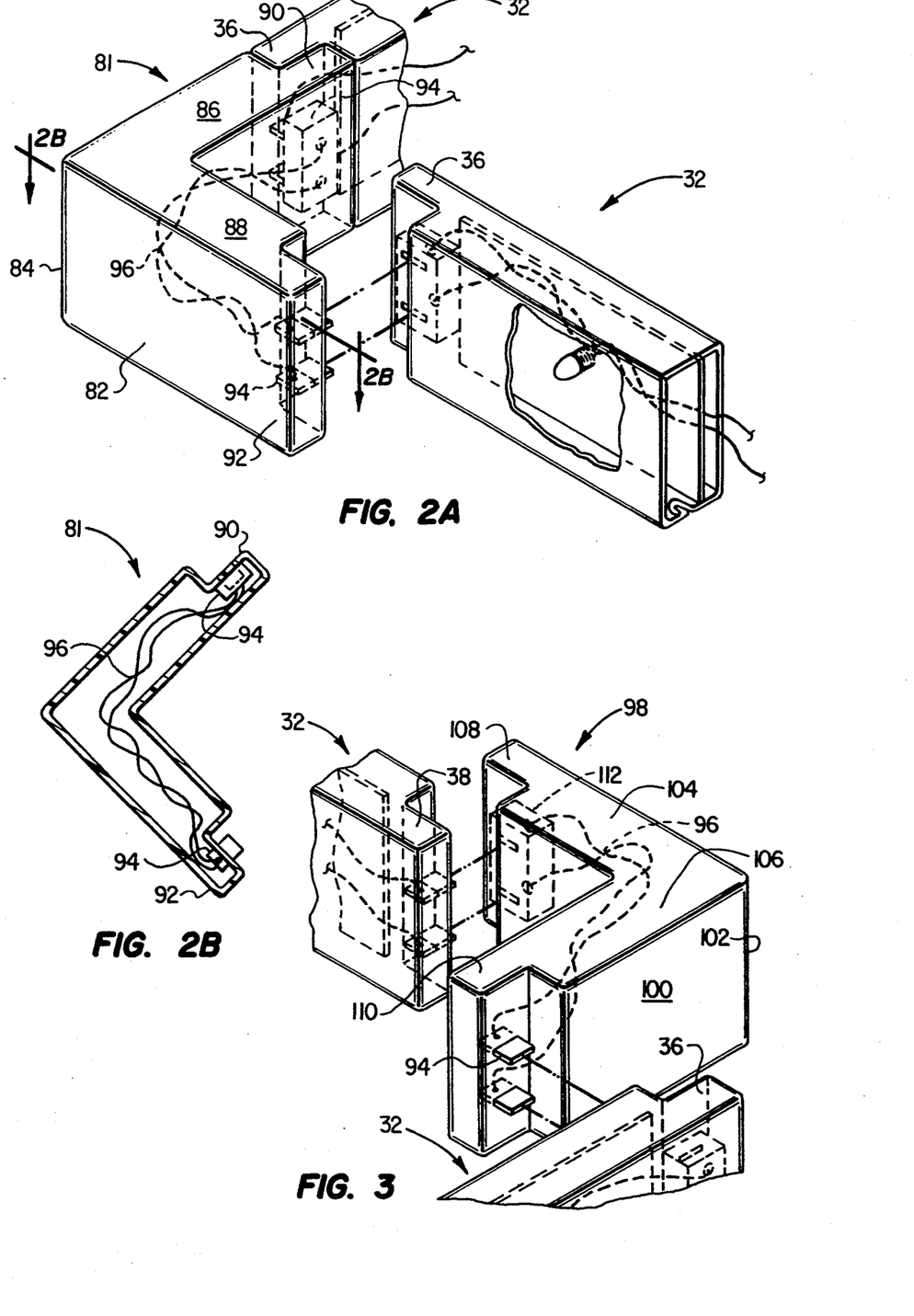
FIG. 2A is an enlarged perspective view at corner 2 of FIG. 1, of an outside corner member of the trim assembly showing how it is electrically connected with the ends of cut-away elongated trim members.
FIG. 2B is the corner member of FIG. 2A cut-away at the level 2B of FIG. 2A revealing the hollow interior of the right angled arms with interconnected plug members at each end.
FIG. 3 is an enlarged perspective view at corner 3 of FIG. 1 of an inside corner member of the trim assembly showing how it is mated with and electrically connected to the ends of cut-away elongated trim members at the ends of its right angled arms.

FIGS. 2A, 2B and 3 depict a comer member. FIG. 2A is an outside comer member, and FIG. 3 is an inside comer member, which are merely reversed.

In FIG. 2A, comer member 81 has a hollow body 82 having a comer 84 with right angled arms 86 and 88 which match the configuration of the hollow body of elongated trim member 32. The arms have ends 90 and 92 which are adapted to fit the ends 36,38 of elongated trim member 32 by mating to form an overlap joint. Each of the ends have plug members 94, which in this case are both male members. Alternately, they could be plug members of the opposite kind, namely, the male member on one end 90 and a female member on the other end 92. In either event, the plug members 94 are electrically interconnected through wires 96 to maintain electrical continuity around the corner. The wires are located in the hollow body portion. This is perhaps better seen in FIG. 2B in which the top portion of comer member 81 is cut away to reveal a hollow thin wall structure in which wires 96 are passed between plug members 94.

FIG. 3 shows inside corner member 98 having a hollow body 100 with corner 102 and right angled arms 104,106 which match the configuration of the hollow body of the elongated trim member 32. The arms have ends 108,110 like those of comer member 81, adapted to fit the end of the elongated trim member by mating to form a lap joint. A plug member 94 is mounted in one end 110 and a plug member 112 is mounted in the other end 108. The end portions 90,94 of corner member 81 and 108,110 of comer member 98 have a depth from front to back which is about half the depth of the hollow body member and just like the ends 36,38 of the elongated trim members 32 so that they will fit and make a neat unobtrusive joint whereby the plug members are interconnected with an elongated trim member at each end and interconnected through wires 96 to each other.

Figure 4A:
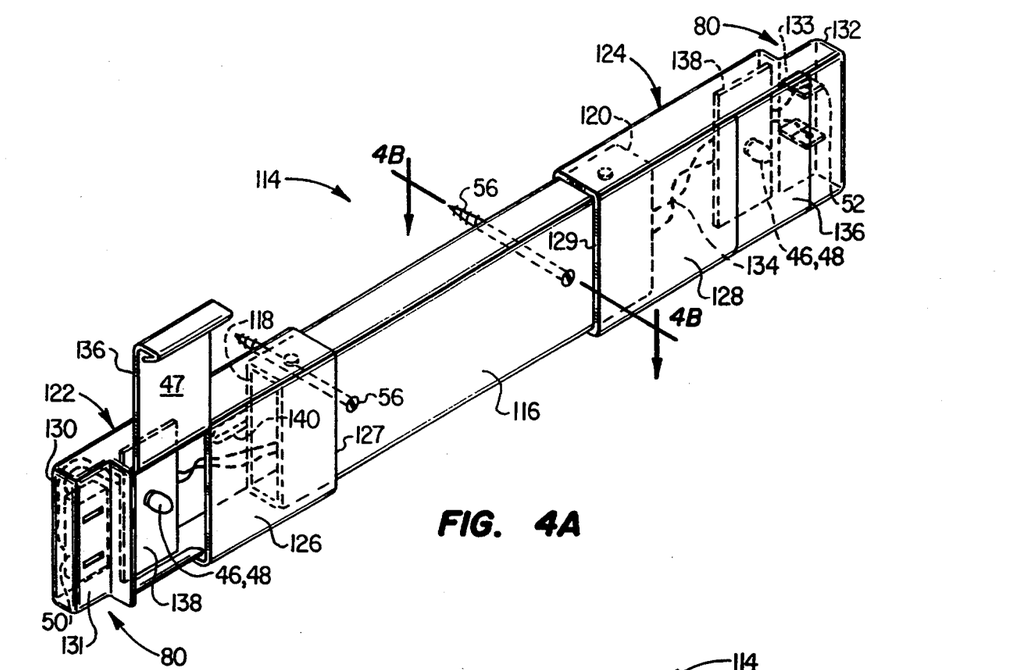
FIG. 4A is an enlarged perspective view at exemplary location 4 of FIG. 1 of an adjustable trim member which is longitudinally adjustable to adjust the length of an assembly of fixed length elongated trim members to fit a run of selected trim line.

FIG. 4A illustrates an adjustable trim member 114 having a centrally located straight section 116. Straight section 116 is also a thin walled hollow body which may be fastened against the side of a wall via fasteners 56. Straight section 116 has a left end 118 and a fight end 120.

End sections are telescopingly supported on the ends of the straight section. Left end section 122 is slidingly supported at end 118 of straight section 116 and right end section 124 is slidingly supported on end 120 of straight section 116. End section 122 has a hollow body 126 with an open side 127 telescopingly supported on end 118. End section 124 has a hollow body 128 with an open side 129 telescopingly supported on end 120. End sections 122,124 are configured to match the configuration of the hollow body of the elongated trim member 32. End section 122 terminates at an end 130 which extends longitudinally outwardly beyond the end of the straight section and end section 124 has an end 132 which similarly extends longitudinally outwardly beyond the end of the straight section, the ends 130,132 being adapted to fit the end of an elongated trim member or a corner member by mating to form a lap joint. Ends 130,132 have a female plug member 50 or male plug member 52 interconnected by wires 134. The depth or thickness of ends 130,132 is about half the thickness of the whole body 126,128, having oppositely oriented facing surfaces 131,133 and L-shaped notches 80 in front of the facing surfaces of ends 130,132. End 130 forms an underlap joint with an end 38 of trim member 32 and end 132 forms an overlap joint with an end 36 of trim member 32 when they are interconnected and mated to each other along a trim line. In other words, they are exactly like the ends of trim member 32.

In order to maintain continuity of lighting display along a straight run of the trim line where an adjustable member 114 is used, one or both end sections 130,132 may have an openable and recloseable hinged cover member 136 forming part of the front panel of hollow body 126,128, spaced apart above an abbreviated mounting panel 138 which may contain a plurality of longitudinally spaced sockets and bulbs 46,48 electrically connected to wires 134 in the same manner as trim member 32. The cover panel, the mounting panel and the bulb or bulbs and sockets are located adjacent the protruding ends 130,132 of member 114 so as not to interfere with the telescoping action illustrated in FIGS. 4B and 4C. The inner surface of panels 136,138 may be provided with a shiny reflective coating to reflect the lights. The cover panel may be wider than shown if multiple lights are desired.

Figure 4B:
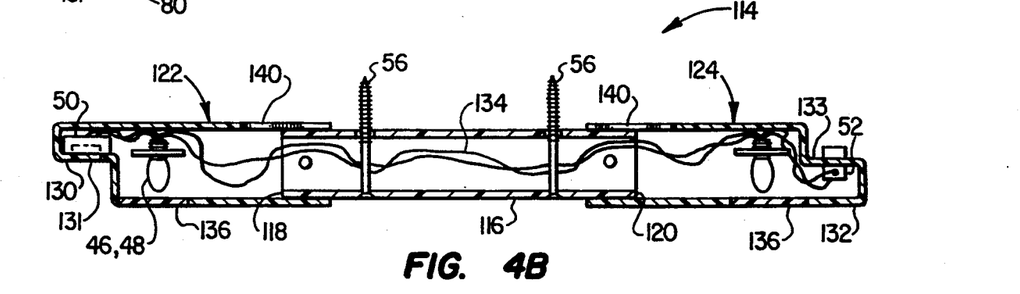
FIG. 4B is the adjustable trim member of FIG. 4A in plan view cut-away at the level 4B in FIG. 4A with the adjustable trim member fully extended in the longitudinal direction.
Figure 4C:
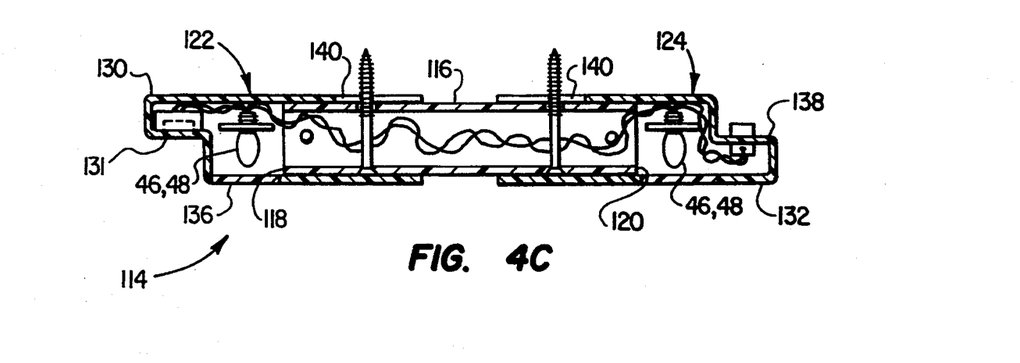
FIG. 4C is the adjustable trim member of FIG. 4B with the opposite end sections partially telescoped toward each other to shorten the adjustable trim member in the longitudinal direction.

In FIG. 4B, end sections 122,124 have been telescopingly slid their full extent away from each other in a longitudinal direction from the ends 118,120 of straight section 116. In this case, the hollow rectangularly shaped body 126 and 128 of the end sections slides over the rectangular cross-section of the straight section 116. Each of the end sections has a slot 140 running longitudinally to the place where openings are provided for fasteners 56 so the fasteners don't provide an obstacle to telescoping movement of the end sections on the straight section. FIG. 4C shows the structure of FIG. 4B wherein the end sections have been telescopingly slid toward each other on straight section 116 to effectively shorten the length of an adjustable member 114. In both FIGS. 4B and 4C, the hinged cover members 136 are closed to hide the bulbs and sockets 46,48.

Figures 8, 9:
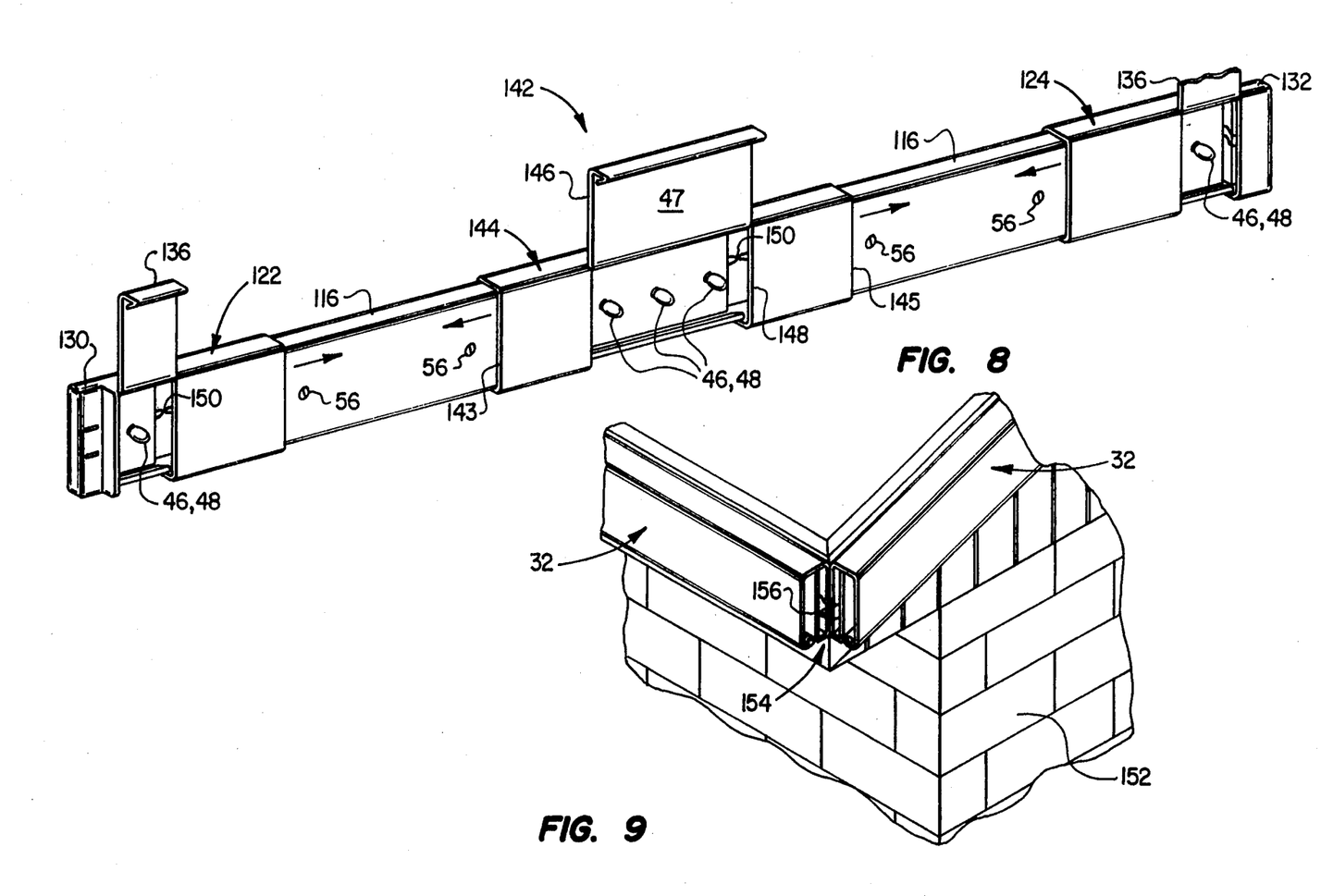
FIG. 8 is a multiply adjustable trim member for filling a non-standard longitudinal space along the trim line between a corner member and an elongated trim member or between two elongated trim members to facilitate the use of elongated trim members of standard length wherein continuity of lighting display is maintained by hideable lights in portions of the multiply adjustable trim member.
FIG. 9 represents a transition along a selected portion of a trim line where a horizontal trim member is electrically connected to an upwardly angled trim member at a corner where the trim line rises at a non-standard angle.

Referring now to FIG. 8, the assembly includes a multiply adjustable trim member 142 which utilizes the components of trim member 114 previously discussed. The common members are straight sections 116, left end section 122 and right end section 124 as described in connection with the discussion of member 114 in FIG. 4A–C. Multiply adjustable trim member 142 includes at least two longitudinally spaced apart straight sections 116 having inner and outer ends. These will be treated as though one of them were rotated 180 degrees so that outer ends will be the ends 118 from FIG. 4A and the inner ends will be the ends 120 from that same figure. Since straight sections are essentially thin-walled rectangularly cross-sectioned box beams, it will not matter which end is turned in which direction. The outer ends will be those furthest from the middle. The outer ends will contain an end section 122 on the left and an end section 124 on the right. These are telescopingly adjustable toward and away from each other in the direction of the arrows as indicated previously with respect to trim member 114.

There is at least one intermediate section 144 having a hollow body with oppositely directed openings 143,145 on either side telescopingly supported by the innermost ends of the longitudinally spaced apart straight sections 116. These are telescopingly slidable in the direction of the arrow toward the end sections so that both the intermediate section and the end sections move toward or away from each other to slide with respect to the straight section or sections on which they are slidingly mounted. The middle of the intermediate section 144 has a front panel 146 with a shiny reflective inner surface 47 comprising an openable and recloseable hinged cover panel which in FIG. 8 is shown in the open position. When cover panel 146 is closed, it is spaced apart in front of a mounting panel 148 spaced behind the cover panel, having a plurality of spaced apart light sockets and lights 46,48. The light sockets are interconnected by wires 150 extending through the intermediate section, straight sections and end sections to plug members mounted in ends 130,132.

Thus, one or both of the end sections may have a cover panel 136 which is openable to reveal one or more lights and the intermediate section has a cover panel 146 which is openable to reveal a multiplicity of sockets and lights to provide continuity in the lighting display of assembled trim members when a multiply adjustable trim member is incorporated in a mated jointed connection between two elongated trim members 32 or between an elongated trim member 32 and a corner member 81 or 98. This enables the trim members to be placed along a straight run of the selected trim line and provides a greater extension than that provided by adjustable trim member 114. This makes it possible to produce the elongated trim members 32 in standard lengths, such as six foot lengths, and still accommodate the structure to fit along a straight run of trim line of different lengths.

FIG. 9 illustrates a nonstandard situation where a corner 152 is shown at the corner of a roof. One elongated trim member 32 in the horizontal orientation has one end cut off in right angle cross-section and another elongated trim member 32 rising along the roof line has one end cut off to match. The cut ends are brought together to form an L-shaped notch 154, the cut-off ends being at 90 degrees to each other. The wires running through the trim members are spliced at 156 after the cuts are made. A rectangular block or plug can be provided to fill the L-shaped notch 154 or flat end caps can be placed on the cut ends of elongated trim members 32. This is a typical but nonstandard situation that cannot be provided for an advance because of varying pitches of roofs.

FIG. 5 represents a non-standard solution for the peak of a gable at 5 in FIG. 1. A short hollow body 158 having thin walls and a rectangular cross-section the size and shape of body 34 of elongated trim member 32 is initially straight and provided with the same ends 36 and 38 of member 32 so as to be able to provide lap joints when mated with another trim member. The body 158 is mitered at 160 to match the angle required at the top of the gable. Wires connecting plug members 50,52 are spliced at splice 156 and the short sections are fastened in place with suitable fasteners (not shown). This provides a mated electrically connected continuation for upwardly angled trim portion 26 and downwardly angled trim portion 28 through the peak of a gable.

In the best mode, it is contemplated that the trim members be made of weather and sun resistant plastic for economical construction. The straight members can be extruded while the nonstraight members can be molded. Most of a run of trim members will be comprised of elongated trim members which should be a convenient standard length, such as six feet. Depending on the size of the lights, the depth of the trim members from front to back can be an inch or several inches and they may be square or rectangular in shape. The corner members can be a standard size, also. The adjustable or multiply adjustable trim members can be made in several lengths to better fit varying trim lines. For example, there may be lengths of 3 inches, one foot, three feet and six feet which respectively expand to a length of five inches, twenty inches, five feet and nine feet. Selective use of the appropriate adjustable member will minimize the number of joints to interconnect to fit a particular linear distance. Shiny reflective surfaces for the mounting plate and the inside of the cover plate can be provided by means of metallic paint or a laminated layer of polymeric material having a thin deposited metallic layer or a layer of bright foil thereon.

It is believed that many variations of the preferred embodiment disclosed herein can be made without departing from the spirit of the inventive concept disclosed.

I claim:

1. A flip-open decorative hidden light trim assembly designed to follow a selected trim line under the eaves of a home, comprising:
   a first elongated trim member having a hollow body with opposite ends, said ends adapted to connect at least one additional trim member of like kind, by mating to form a joint whereby the combined trim members can follow the selected trim line;
   the hollow body having a front surface extending between the opposite ends, the front surface comprising a cover panel which is openable to an open position to expose the interior of said hollow body and recloseable;
   a mounting panel spaced behind the cover panel in the hollow body, having a plurality of longitudinally spaced light sockets thereon for receiving lights therein which are exposed when the cover panel is open;
   plug members located at the opposite ends of the elongated trim member, said plug members being electrically interconnected with the light sockets so that when an end of one trim member is mated with the end of another trim member to form a joint, a male plug member and a female plug member are electrically engaged;
   whereby adjacent trim members can be interconnected at said ends to follow said trim line to create a relatively permanent decorative trim assembly containing hidden lights which can be easily exposed to view by opening the cover panels;
   a corner member comprising a hollow body with right angled arms matching the hollow body of the elongated trim member, the arms having ends adapted to fit the end of said elongated trim member by mating to form a joint;
   each end of the arms of said corner member having an electrically interconnected male or female plug member positioned so that when an end of an elongated trim member is mated with an end of said corner member to form a joint, a male plug member and a female plug member are electrically engaged;
   whereby the combined corner member and at least one elongated trim member have their respective ends connected at a joint to follow the selected trim line around a corner.

2. The assembly of claim 1 further including an adjustable trim member having a straight section having ends to telescopingly carry end sections, which can slide toward or away from each other;
   end sections having a hollow body telescopingly supported on the ends of the straight section to slide toward or away from each other, the end sections being configured to match the configuration of the hollow body of the elongated trim member;
   the end sections each terminate at an end which extends longitudinally outwardly beyond an end of the straight section, the ends of the end section being adapted to fit the end of an elongated trim member or a corner member by mating to form a joint and having a male or female plug member so that when the end of the adjustable trim member is mated with the end of another trim member to form a joint, a male and female plug member are electrically engaged;
   the adjustable trim member being insertable between two elongated trim members or one elongated trim member and a corner member, the adjustable trim member being adjustable in length to provide some adjustment in length of a portion of the trim line along a straight run of elongated trim members.

3. The assembly of claim 2 wherein the hollow body of at least one end section of the adjustable trim member includes a front surface comprising an openable and recloseable cover panel, a mounting panel spaced behind the cover panel having one or more interconnected spaced light sockets for receiving lights which are exposed when the cover panel is open, said light sockets being electrically connected to said plug members at the ends of the end sections of the adjustable trim member to create continuity in the lighting display of assembled trim members along a trim line which contain an adjustable trim member.

4. The assembly of claim 1 further including a multiply adjustable trim member, comprising:
   at least two longitudinally spaced apart straight sections having inner and outer ends;
   at least one intermediate section having a hollow body with oppositely directed openings telescopingly supported at each side by said inner ends of the longitudinally spaced apart straight sections;
   a central portion of the hollow body of the intermediate section having a front panel comprising an openable and recloseable cover panel and a mounting panel spaced behind the cover panel, having spaced apart light sockets for receiving lights which are exposed when the cover panel is open;
   end sections having a hollow body telescopingly supported on the outer ends of the at least two longitudinally spaced apart straight sections and configured to match the configuration of the elongated trim member;

said end sections terminating at oppositely directed ends adapted to fit an end of the elongated trim member by mating to form a joint therewith, the oppositely directed ends having a male or female plug member so that when the end of an end section is mated with said elongated trim member to form a joint, male and female plug members are electrically engaged;

electrical connection means for electrically connecting the plug members of said end sections and said spaced apart light sockets;

whereby the multiply adjustable trim member may be longitudinally adjusted by telescoping movement of the end sections or the intermediate section with respect to the at least two straight sections to alter the length of trim members connected along the trim line and provide continuity in the lighting display of assembled trim members.

5. A flip-open decorative hidden light trim assembly designed to follow a selected trim line under the eaves of a home, comprising:

a first elongated trim member having a hollow body with opposite ends, said ends adapted to connect at least one additional trim member of like kind, by mating to form a joint whereby the combined trim members can follow the selected trim line;

the hollow body having a front surface extending between the opposite ends, the front surface comprising a cover panel which is openable to an open position to expose the interior of said hollow body and recloseable;

a mounting panel spaced behind the cover panel in the hollow body, having a plurality of longitudinally spaced light sockets thereon for receiving lights therein which are exposed when the cover panel is open;

plug members located at the opposite ends of the elongated trim member, said plug members being electrically interconnected with the light sockets so that when an end of one trim member is mated with the end of another trim member to form a joint, a male plug member and a female plug member are electrically engaged;

whereby adjacent trim members can be interconnected at said ends to follow said trim line to create a relatively permanent decorative trim assembly containing hidden lights which can be easily exposed to view by opening, the cover panels;

the hollow body of the elongated trim member is a main body with thin right angled walls having a length, a height and a depth and containing said mounting panel within, said cover panel when closed being a front wall spaced over said mounting panel;

the depth of the main body being determined by spaced apart upper and lower walls extending along its length perpendicular to the front wall, rear edges of the upper and lower walls defining a rear surface parallel to the front wall which can lie against a vertical surface of a home;

the opposite ends of the elongated trim member, each of said opposite ends protruding a short distance beyond the length of the main body, and each having a facing surface parallel to said front wall and said rear surface and a depth about half the depth of the main body so that a lap joint can be formed when one end of one elongated trim member is mated to the other end of another elongated trim member along the selected trim line.

6. The assembly of claim 5 wherein the opposite ends of the elongated trim member protrude a distance sufficient to mount a plug member therein with a male portion or the female portion thereof extending in the depth direction respectively from the facing surface or into the facing surface of the end section.

7. The assembly of claim 6 wherein:

one end of the elongated trim member has a depth that extends from said rear surface to its facing surface and the opposite end has a depth that extends from the front wall to its facing surface to create an L-shaped notch in front of said one end and an L-shaped notch behind said opposite end, said L-shaped notches being the same size as said one end or said opposite end;

the opposite ends of the elongated trim member having a male or female plug member at one end and a female or male plug member at the opposite end so that when viewed from the front, a left side has one kind of plug member and the right side has the opposite kind of plug member, wherein a lap joint can be being made by mating a right side of one elongated trim member with a left side of another elongated trim member along said selected trim line to form said lap joint.

8. The assembly of claim 7 wherein the cover panel has an inner surface which is provided with a shiny reflective coating to reflect light from lights in the sockets of the mounting board when the cover is in the open position.

9. The assembly of claim 5 wherein the cover panel has an inner surface which is provided with a shiny reflective coating to reflect light from lights in the sockets of the mounting board when the cover is in the open position.

10. The assembly of claim 5 wherein the mounting panel has an inner surface which is provided with a shiny reflective coating to reflect light from lights in the sockets of the mounting board when the cover is in the open position.

11. A flip-open decorative hidden light trim assembly designed to follow a selected trim line under the eaves of a home, comprising:

a first elongated trim member having a hollow body with opposite ends, said ends adapted to connect at least one additional trim member of like kind, by mating to form a joint whereby the combined trim members can follow the selected trim line;

the hollow body having a front surface extending between the opposite ends, the front surface comprising a cover panel which is openable to an open position to expose the interior of said hollow body and recloseable;

a mounting panel spaced behind the cover panel in the hollow body, having a plurality of longitudinally spaced light sockets thereon for receiving lights therein which are exposed when the cover panel is open;

plug members located at the opposite ends of the elongated trim member, said plug members being electrically interconnected with the light sockets so that when an end of one trim member is mated with the end of another trim member to form a joint, a male plug member and a female plug member are electrically engaged;

whereby adjacent trim members can be interconnected at said ends to follow said trim line to create a relatively permanent decorative trim assembly containing hidden lights which can be easily exposed to view by opening the cover panels;
wherein the cover panel has an inner surface which is provided with a shiny reflective coating to reflect light from lights in the sockets of the mounting panel when the cover is in the open position.

12. The assembly of claim 11 wherein the mounting panel has an inner surface which is provided with a shiny reflective coating to reflect light from lights in the sockets of the mounting board when the cover is in the open position.

13. A flip-open decorative hidden light trim assembly designed to follow a selected trim line under the eaves of a home, comprising:
 an elongated trim member having a hollow main body with thin walls defining spaced apart front and rear surfaces and spaced apart upper and lower surfaces, the main body having a length, defining opposite ends, a height determined by the spacing of the upper and lower surfaces and a depth defined by the spacing of the front and rear surfaces;
 the front surface of the hollow main body comprising a cover panel which is openable to an open position to expose the interior of said main body and recloseable to hide said interior;
 a mounting panel in the hollow main body spaced behind the cover panel and having a plurality of longitudinally spaced lights which are exposed when the cover panel is open;
 an underlap connection extending from one end opposite and an overlap connection extending from the other opposite end of the hollow main body, said underlap and overlap connection being half as deep as said main body and offset from each other in the depth direction, the underlap connection having a facing surface facing frontwardly, the overlap connection having a facing surface facing rearwardly, the underlap connection of one elongated trim member and the overlap connection of another elongated trim member being mateable with each other to make an overlap joint between adjacent trim members along a trim line to make a smooth transition;
 said underlap and overlap connection extending sufficiently beyond said hollow main body to accept a plug member;
 a plug member mounted in the underlap connection and a plug member mounted in the overlap connection, being electrically interconnected through said lights, said plug members being electrically engageable when an underlap connection of one trim member is mated with an overlap connection of another trim member to form an overlap joint between said mated trim members.

14. The assembly of claim 13 wherein the cover panel has an inner surface which is provided with a shiny reflective coating to reflect light from lights in the mounting board when the cover is in the open position.

15. The assembly of claim 13 further including an adjustable trim member comprising:
 a straight body section having ends adapted to telescopingly carry end sections;
 end sections having a hollow body telescopingly carried on the ends of the straight section for movement toward or away from each other, the end sections being configured to match the configuration of the elongated trim member;
 one of the end sections having an underlap connection and the other of the end sections having an overlap connection, said underlap connection having a plug member and said overlap connection having a plug member said plug members being electrically interconnected through said straight section;
 one of said end sections having a mounting panel in its hollow body and a plurality of spaced lights extending therealong and electrically connected to its plug member, the hollow body of said one of said end sections having a front surface comprising a cover member spaced above said mounting panel in said hollow body, said cover panel being openable to expose said lights and recloseable to hide said lights;
 the underlap connection of said one end section being mateable with the overlap connection of the elongated trim member to make an overlap joint, the overlap connection of the other end section being mateable with the underlap connection of another elongated trim member to make an overlap joint, said joints between the end sections and the elongated trim members being electrically connected via their plug members;
 whereby the adjustable trim member can be inserted between two elongated trim members or a corner trim member and an elongated trim member to provide some adjustment in length of a portion of the trim line along a straight run of elongated trim members.

16. The assembly of claim 15 further having a corner member comprising a hollow body with two right angled arms matching the configurations of the hollow body of the elongated trim member, one of the arms having an underlap connection and a plug member therein, the other of the arms having an overlap connection and a plug member therein, said plug members being electrically interconnected through the body of the corner member whereby the underlap and overlap connections of said corner member are mateable to form an overlap joint with said elongated trim member to continue the selected trim line around a corner.

17. The assembly of claim 13 wherein the mounting panel has an inner surface which is provided with a shiny reflective coating to reflect light from lights in the sockets of the mounting board when the cover is in the open position.

18. A flip-open decorative hidden light trim assembly designed to follow a selected trim line under the eaves of a home, comprising:
 an elongated trim member having a hollow body with opposite ends adapted to fit the end of another trim member of like kind, by mating to form a joint whereby the combined trim members can follow the selected trim line;
 the hollow body having a front surface extending between the opposite ends, the front surface comprising a cover panel which is openable to an open position to expose the interior of said hollow body and recloseable;
 a mounting panel spaced behind the cover panel in the hollow body, having a plurality of longitudinally spaced light sockets thereon for receiving lights therein which are exposed when the cover panel is open;

plug members located at the opposite ends of the elongated trim member, said plug members being electrically interconnected with the light sockets so that when an end of one trim member is mated with the end of another trim member to form a joint, a male plug member and a female plug member are electrically engaged;

a corner member comprising a hollow body with right angled arms matching the hollow body of the elongated trim member, the arms having ends adapted to fit the end of said elongated trim member by mating to form a joint;

each end of the arms of said corner member having an electrically interconnected male or female plug member positioned so that when an end of an elongated trim member is mated with an end of said corner member to form a joint, a male plug member and a female plug member are electrically engaged;

an adjustable trim member having a straight section having ends to telescopingly carry end sections on each end, which can slide toward or away from each other;

end sections having a hollow body telescopingly supported on the ends of the straight section to slide toward or away from each other, the end sections being configured to match the configuration of the hollow body of the elongated trim member;

the end sections each terminate at an end which extends longitudinally outwardly beyond an end of the straight section, the ends of the end section being adapted to fit the end of an elongated trim member or a corner member by mating to form a joint and having a male or female plug member so that when the end of the adjustable trim member is mated with the end of another trim member to form a joint, a male and female plug member are electrically engaged;

the adjustable trim member being insertable between two elongated trim members or one elongated trim member and a corner member, the adjustable trim member being adjustable in length to provide some adjustment in length of a portion of the trim line along a straight run of elongated trim members;

the hollow body of at least one end section of the adjustable trim member includes a front surface comprising an openable and recloseable cover panel, a mounting panel spaced behind the cover panel having one or more interconnected spaced light sockets for receiving lights which are exposed when the cover panel is open, said light sockets being electrically connected to said plug members at the ends of the end sections of the adjustable trim member to create continuity in the spaced light sockets of mated assembled trim members along a trim line which contain an adjustable trim member;

whereby adjacent ones of said corner member and said trim members can be interconnected at said ends to follow said trim line to create a relatively permanent decorative trim assembly containing hidden lights which can be easily exposed to view by opening the cover panels.

19. The assembly of claim 18 wherein the ends of components comprising elongated trim member, the corner member and the end sections of the adjustable trim member, protrude longitudinally to form a half lap for a lap joint which corresponds to the thickness of the hollow body members of said components to continue said hollow bodies of said components smoothly through said lap joints between the ends of interconnected ones of said components.

20. The assembly of claim 19 wherein the half lap longitudinally protruding ends of the components comprising said elongated trim member, the corner member and the adjustable trim member comprise an underlap on one side of the components and an overlap on an opposite side of the components whereby an underlap of one component is mateable to form a lap joint with the overlap of another component and wherein said underlap contains one of a male or female plug member and said overlap contains the other of a male or female plug member wherein a male and a female plug member are electrically and mechanically interconnected when said lap joint is formed.

21. The assembly of claim 18 further including a multiply adjustable trim member, comprising:
- at least two longitudinally spaced apart straight sections having inner and outer ends;
- at least one intermediate section having a hollow body with oppositely directed openings telescopingly supported at each side by said inner ends of the longitudinally spaced apart straight sections;
- a central portion of the hollow body of the intermediate section having a front panel comprising an openable and recloseable cover panel and a mounting panel spaced behind the cover panel, having spaced apart light sockets for receiving lights which are exposed when the cover panel is open;
- end sections having a hollow body telescopingly supported on the outer ends of the at least two longitudinally spaced apart straight sections and configured to match a configuration of the elongated trim member;
- said end sections terminating at oppositely directed ends adapted to fit an end of the elongated trim member by mating to form a joint therewith, the oppositely directed ends having a male or female plug member so that when the end of an end section is mated with said elongated trim member to form a joint, male and female plug members are electrically engaged;
- electrical connection means for electrically connecting the plug members of said end sections and said spaced apart light sockets;
- whereby the multiply adjustable trim member may be longitudinally adjusted by telescoping movement of the end sections or the intermediate section with respect to the at least two straight sections to alter the length of trim members connected along the trim line and provide continuity in the lighting display of assembled trim members.

* * * * *